(12) United States Patent
Altmeyer et al.

(10) Patent No.: US 7,018,493 B2
(45) Date of Patent: Mar. 28, 2006

(54) METHOD FOR PRODUCING A CONNECTION INTERFACE IN A FILTER ELEMENT AND DEVICE FOR PRODUCING THE SAME

(75) Inventors: Gerd Altmeyer, St. Ingbert (DE); Jurgen Lang, Sulzbach (DE); Harald Mees, Lebach (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 5 days.

(21) Appl. No.: 10/483,084

(22) PCT Filed: Jun. 26, 2002

(86) PCT No.: PCT/EP02/07037

§ 371 (c)(1),
(2), (4) Date: Jan. 8, 2004

(87) PCT Pub. No.: WO03/009922

PCT Pub. Date: Feb. 6, 2003

(65) Prior Publication Data

US 2004/0173303 A1    Sep. 9, 2004

(30) Foreign Application Priority Data

Jul. 20, 2001 (DE) ................................ 101 35 421

(51) Int. Cl.
*B32B 31/16* (2006.01)

(52) U.S. Cl. .................. 156/73.1; 156/203; 156/580.2; 55/498

(58) Field of Classification Search ................ 156/73.1, 156/196, 203, 209, 219, 290, 292, 466, 580.1, 156/580.2, 581, 583.1; 55/497, 498, 502
See application file for complete search history.

(56) References Cited

U.S. PATENT DOCUMENTS

| 4,079,570 | A    | 3/1978 | Rucker |         |
|-----------|------|--------|--------|---------|
| 6,267,832 | B1 * | 7/2001 | Choi ........................... | 156/70 |
| 6,364,978 | B1 * | 4/2002 | Skov et al. ................ | 156/73.1 |
| 6,379,438 | B1 * | 4/2002 | Schneider et al. ............ | 96/154 |
| 6,451,205 | B1 * | 9/2002 | McGaw, Jr. ................ | 210/168 |

FOREIGN PATENT DOCUMENTS

| DE | 19651242 A1 | 6/1998 |
| EP | 0386701 A2 | 9/1990 |
| JP | 07017568 A | 1/1995 |
| JP | 09142416 A | 6/1997 |
| WO | WO 9910080 A1 | 3/1999 |
| WO | WO 0105483 A1 | 1/2001 |

* cited by examiner

*Primary Examiner*—James Sells
(74) *Attorney, Agent, or Firm*—Roylance, Abrams, Berdo & Goodman, L.L.P.

(57) ABSTRACT

A method produces a connection interface in a tubular filter element for filtering liquids, including a filter mat (10). The opposite ends (14) of the filter mat are interconnected in a connection position by a planar weld seam (28) provided with an embossed strip in the region of the free ends (14) of the filter mat. A region is provided between the embossed weld seam (30) and the beginning of the transition towards the tubular filter mats, in which a smooth weld seam (32) is applied without embossing in a flat strip along the ends (14) of the filter mat. This arrangement enables the ends of the filter mat to be welded together in a strong and long-lasting manner. The embossed weld seam is simultaneously unloaded of any stress by the smooth weld seam.

15 Claims, 6 Drawing Sheets

METHOD FOR PRODUCING A CONNECTION INTERFACE IN A FILTER ELEMENT AND DEVICE FOR PRODUCING THE SAME

FIELD OF THE INVENTION

The present invention relates to a method for producing a connection interface in a tubular filter element for filtration of fluids having a filter mat. The opposite ends of the filter mat are connected to each other by a flat weld seam provided with an impressed strip in the area of the free ends of the filter mat. The present invention also relates to a tubular filter element made by this method.

BACKGROUND OF THE INVENTION

Filter elements produced with filter mat end seals are used for filtration of liquids, such as hydraulic fluid or solutions of all kinds such as suspensions, dispersions, emulsions, or colloidal solutions. They have generally proved to be successful because of their compact structure and their large filter area. To make certain that the fluid flow is conducted only through the filter medium itself, in addition to the seal on the two axial ends, the connection interface of the two opposite ends of the filter mat, in the form of end webs, form one of the critical points which are to be closed and made leakproof.

Known filter elements readily obtained through commercial channels may have a filter mat made up of various filter materials. The filter materials are folded in a zigzag fashion or are pleated, and are then mounted around a solid support tube provided with openings and enclosed in a fine-meshed wire screen following the fold contour of the filter mat as protection from external damage. In a part of the known processes for production of the known filter elements, the connection interface of the filter mat ends, as well as the connection of the filter mat to the ends, are obtained by a bed of an adhesive, such as one in the form of an epoxy resin adhesive. Waiting periods are needed until the adhesive becomes capable of bearing a load, depending on its gelling or cure time. The filter can only be used after its setting period as determined by the adhesive employed.

EP-B-0 001 407 discloses a process for production of a tubular corrugated filter element provided with at least one sheet of filter cloth. The filter cloth edges forming a side connection are stacked and are connected to each other to form a side edge seal by a self-supporting groove-like strip. The strip, as an adhesively connecting strip, comprises a thermoplastic resin which encloses the edges of the filter sheet. The strip is adhesively joined to the filter sheet. The edges of the filter sheet are sealed together in an interlocking seal so as to be leakproof, as a result of which escape of an unfiltered fluid between the edges of the of filter sheet of the tubular filter element is prevented. The connecting strip forms a U-shaped longitudinal clip which is welded to the ends of the filter mat by heating plates after being subjected to heat and pressure.

Consequently, the adhesive connections described for the preceding disclosed process, as well as the accompanying production costs are avoided. The free limbs of the strip-like connecting clip are designed to be flexible. These limbs may be moved apart when the ends of the filter mat are inserted so that the clamping pressure required may be applied to them for fastening. At the point of passage of the two free limbs of the longitudinal seam clip, the clip forms a stop against which the free ends of the filter mat ends come into contact and/or by which their movement in the direction of insertion into the clip is limited. The filter mat ends are flush with each other and assume the specified position required for production of the welded connection in the form of a smooth seam. However, despite the steps provided for this purpose, the filter mat ends may be forced together during introduction of the configuration into a welding device, with the result that the quality of the weld seam to be applied may be appreciably lowered. Consequently, the filter element may subsequently fail in the area of the welded seam points when in use. This is true in particular of filter elements subjected to high stresses when the weld seam connection is separated, something which may result both in failure of the filter element and in failure of an entire hydraulic assembly in which that filter element has been installed.

DE-A-196 51 242 discloses the anvil of an ultrasonic sealing unit for sealing at least two fields of material formed of backing material coated with plastic. A sonotrode is movable relative to the anvil. The seal surface on the front of the body of the anvil is contoured by raised and lowered areas. With this solution, it is not possible to seal or weld tubular filter elements and their filter materials by means of ultrasound. Also, a smooth weld seam is applied on the free end of the surface materials to be connected. This welding is favorable for milk cartons, since such cartons are designed to be opened easily by hand in the area of the smooth weld seam. Reliability in operation, even under high load, cannot be achieved with the solution disclosed.

WO 01/05483 A1 (corresponding to pending U.S. patent application Ser. No. 09/979,865) discloses a generic process for production of a connection interface in a tubular filter element having a pleated filter mat. The opposite filter mat ends are fixed in position by a connecting strip which overlaps the ends at least in part. The connecting device comprises a thermoplastic which is welded to the ends of the filter mat. The welding process is carried out without a welding filler, and connects the clip to the ends of the filter mat in the fused state. In the welding process, an impression is made in the connecting strip, in the form of the plastic clip, at least along one of its two sides such that the filter mat ends are welded to each other in compressed form. Since the welding process can be carried out in an extremely short time, simultaneously with introduction of the embossing, efficient production without use of additional epoxy resin adhesives or the like is possible. Since no holding or gelling times arise, the element may be used immediately or may immediately undergo additional processing.

Another result of the embossing is that the filter mat ends are welded together in compressed form so that an especially strong and lasting connection is obtained for the filter mat ends, even if these ends are subjected to very high fluid pressures during filtration. Since the filter mat ends are pulled apart beyond the embossed welding seam in the direction of the pleated elements of the filter mat because of the internal stress of the material, a wide gap occurs in this area. The wide gap impairs the sealing efficiency, and may be a factor if the embossed weld seam as produced is not entirely clean and is forced apart so that passages may be formed for undesirable escape of fluid. Introduction of material stresses into the embossed weld seam through the additionally widening gap occurs in the transitional area between pleating and embossed weld seam, so that the respective weld seam undergoes introduction of high punctate or linear forces to such an extent that failure may also occur, particularly if the filter element is subjected to alternating pressure stresses during operation.

SUMMARY OF THE INVENTION

Objects of the present invention are to provide a process for production of a tubular filter element which ensures connection of the filter mat ends while avoiding use of adhesives, which reduces the volume of material used in manufacturing and accordingly lowers the production costs, and which produces a reliably operating connection interfaces, even under the highest stresses.

The foregoing objects are basically attained by providing, between the embossed weld seam and the beginning of the area of transition to the tubular filter mat, an area in which a smooth weld seam free of embossing is applied in a flat path along the filter mat ends. Welding of the filter mat ends to each other in compressed form over the embossing is achieved, so that an especially strong and durable connection of the filter mat ends is obtained, even if such ends should be subjected to very high fluid pressures during filtration. At the same time, however, the embossed weld seam is relieved of stresses by the smooth weld seam. In the event of any undesired penetration in the area of the embossed weld seam, the smooth weld seam continues to be able itself to absorb the forces arising during operation of the filter element and to ensure leakproof connection of the filter element to the exterior. The average specialist in this field is surprised to learn that a better sealing result is obtained, even by way of the smooth weld seam free of embossing than with the embossed weld seam used up to the present.

In addition to relief of pressure on the embossed weld seam by the smooth weld seam, however, the embossed weld seam is also advantageous for production of the smooth weld seam, since the free filter mat ends are precisely adjusted in relation to each other during the embossing process and so are connected to each other free of displacement. This feature also promotes improvement in the quality of the smooth weld seam, which is produced simultaneously with the embossed weld seam, and accordingly, is marked by very high production quality. Simultaneous application of smooth weld seam and embossed weld seam thus yields a synergistic effect, such that the two intrinsically different weld seam areas exert a favorable effect on the other weld seam area.

The device for performing the present invention employs an ultrasonic welding device for production of the filter element. Such connection process is especially favorable with respect to energy needed for the filter mat ends.

In one preferred embodiment of the process of the present invention, for connection of the filter mat ends, a connecting strip in the form of a clip is used which is composed of a thermoplastic and holds the filter mat ends together during the welding process after the clip has been positioned on these ends. This connecting clip is advantageous, especially if the filter mat itself has only a small amount of plastic materials which may be joined together by thermal means. In addition, placing a connecting strip subsequently to be welded in position may be advantageous if the outermost filter mat layer comprises a metal support wire fabric.

In another preferred embodiment of the process of the present invention, the embossing is in the form of rectangular, and in particular square, embossed elements which preferably are adapted to the lattice structure of the respective filter mat fabric. As a result, the respective embossing of bonded plastic material may be introduced into the free spaces in the structure of the fabric to ensure a connection of especially great strength. If the fabric is composed of a fabric material, the fabric material may be bonded directly to the embossed material of the respective embossing.

In one preferred embodiment of the process, the thermal welding process uses an ultrasonic welding device having a sonotrode in the form of a strip and an anvil opposite it. The anvil at least is provided with an embossing device for application of the embossed weld seam and with an area free of embossing for application of the smooth weld seam. The device may be used in a single operating step for simultaneous application of the embossed weld seam and the smooth weld seam in the area of the filter mat ends.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 3:
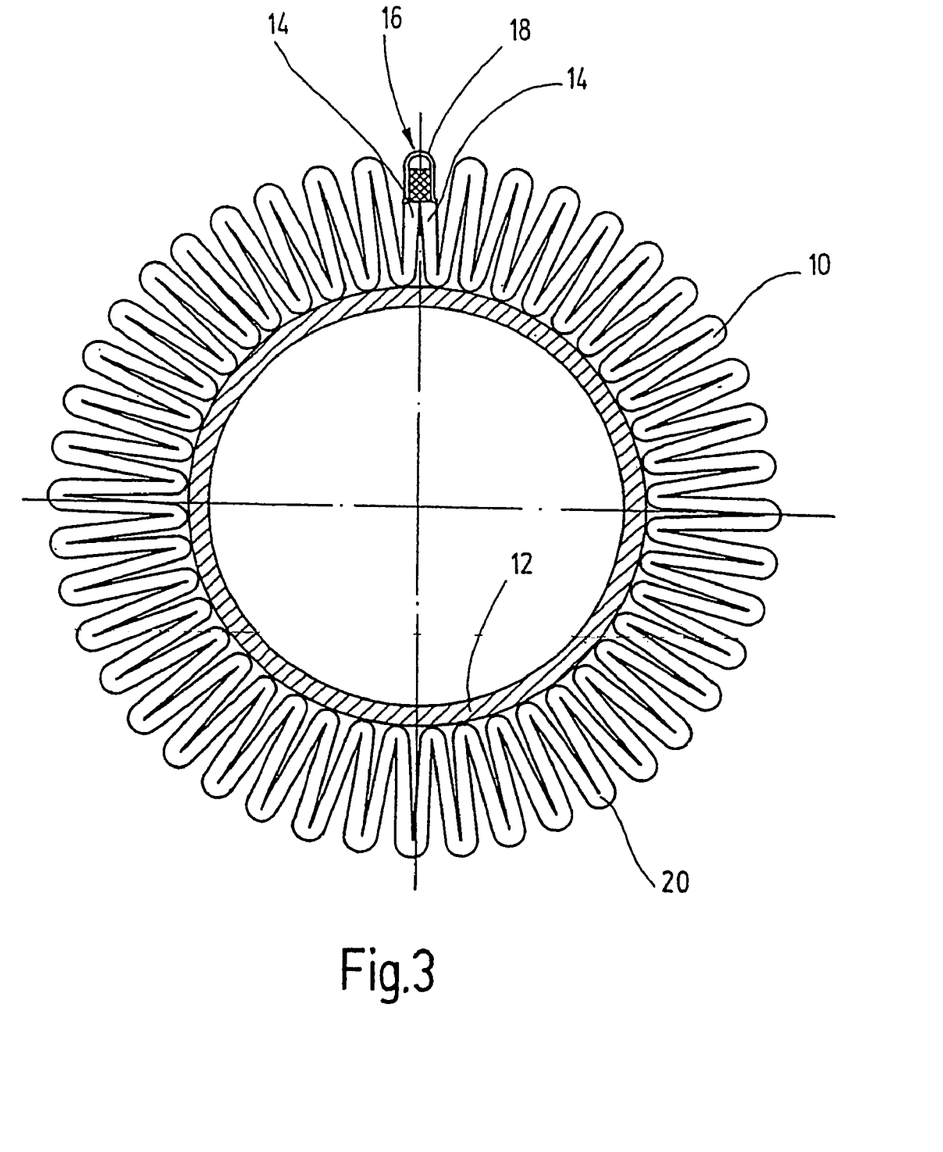
FIG. 3 is a front elevational view of the filter element partly in cross-section according to an embodiment of the present invention.

A front view of the tubular filter element is presented in FIG. 3. The filter element is used for filtration of fluids and has a filter mat 10 folded in zigzag form or pleated. Although not shown in detail, the filter mat 10 is made of multiple layers and may have the following laminate structure, for example, from the exterior inward:

1. Metal wire fabric or plastic fabric or plastic screen with reticular structure;
2. Polyester formed fabric;
3. Glass fiber mat or meltblown formed fabric;
4. Glass fiber mat or meltblown formed fabric;
5. Paper fabric or polyester formed fabric;
6. Composite special steel-polyester fabric; and
7. Metal wire fabric or plastic fabric or plastic screen with reticular structure.

To support the filter mat 10, the interior of the filter element has a metal support tube provided with fluid passages (not shown). The two opposite ends 14 of the filter mat 10 extend at an acute angle to each other. Their length is kept somewhat shorter than the folds of the filter mat 10 mounted adjacent to them. Because of the layered materials used, the tubular filter mat 10 is flexible and the pleated filter paths may be stacked, for example, as is illustrated by way of example in FIGS. 1 and 4. The support tube 12 consequently imparts a certain amount of stability to the filter mat 10 and defines its position in the subsequent filter element. A connecting device fastens the opposite ends 14 of the filter mat 10. The connecting device, as is shown in the figures, overlaps the ends 14 at least to some extent from the direction of their free ends. The connecting device is configured as a connecting strip 16 in the form of a clip 18. Clip 18 is placed in position on the filter mat ends 14, and holds these ends in position for a thermal welding process. The clip 18 is non-detachably connected to the filter mat ends 14 while in the melted state. The connecting device in the form of the connecting clip 18 is preferably composed of a polyamide or polyester material which possesses good thermal welding properties.

For the sake of greater simplicity of presentation, the individual layers of the filter mat 10 are shown in the illustrations as a laminated unit 20. The screen-like outermost plastic or metal wire fabric is designated as 22 in FIGS. 2 and 6.

Figure 1:
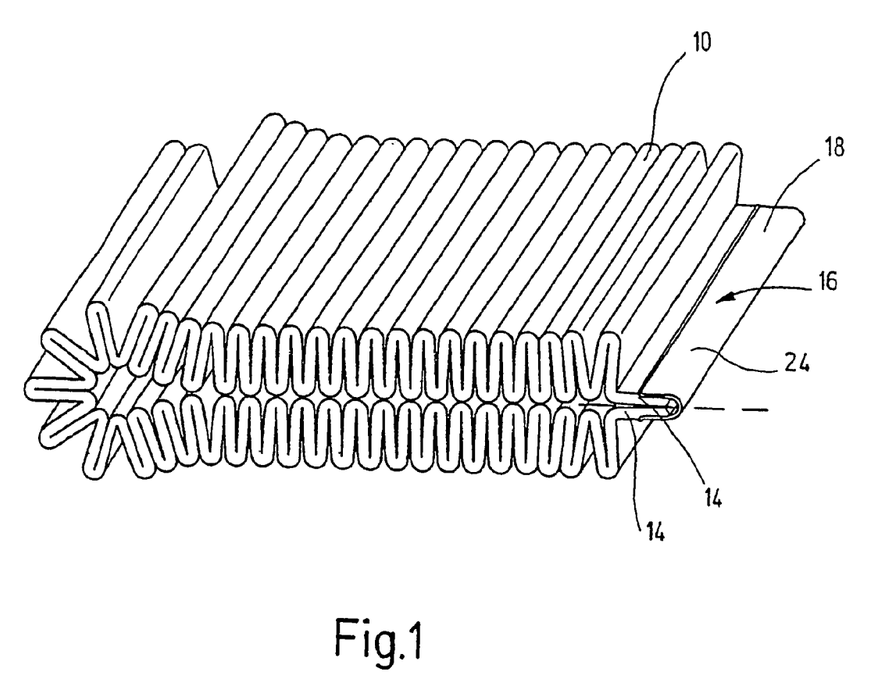
FIG. 1 is a perspective view of the filter mat with the connecting clip, not welded, according to an embodiment of the present invention.
Figure 2:
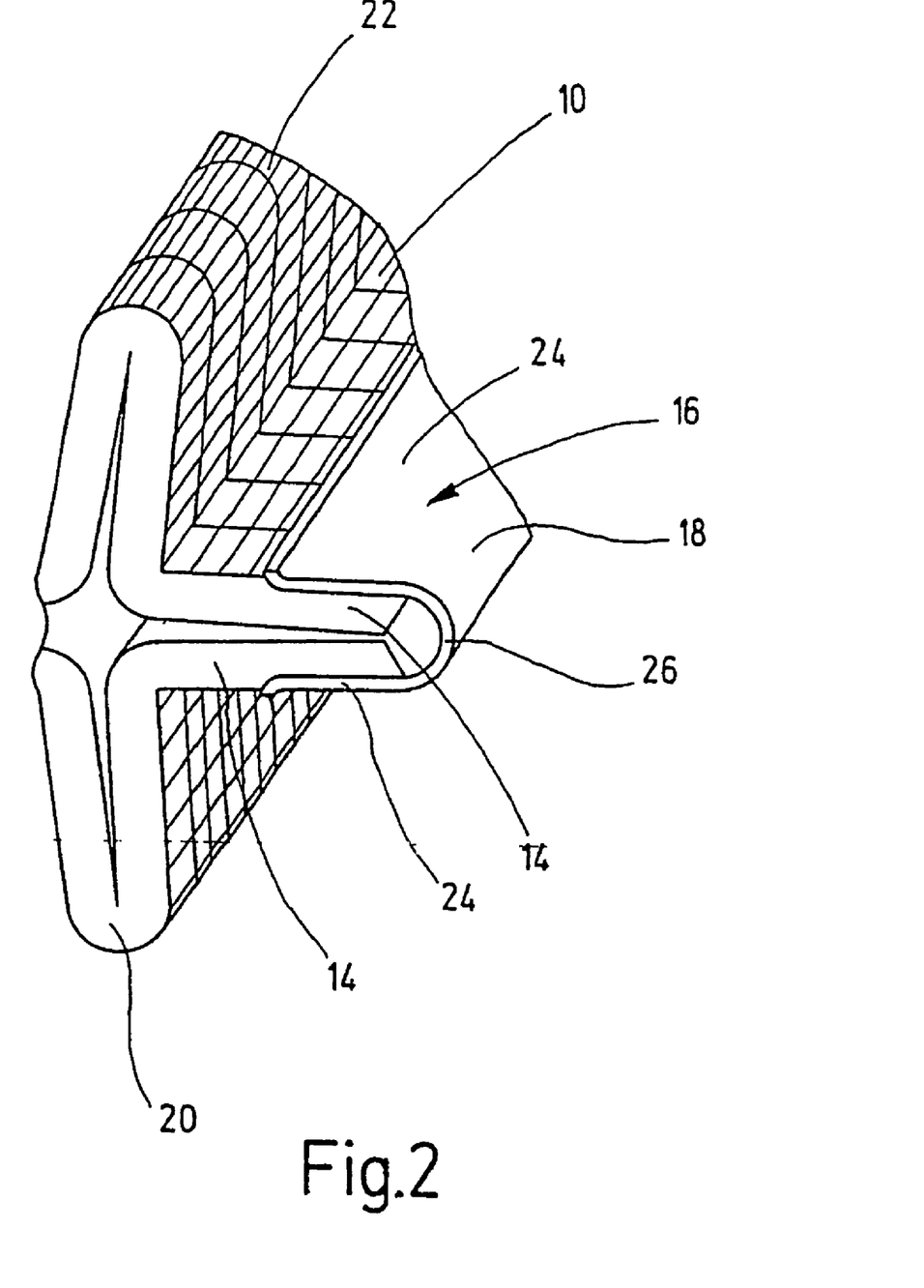
FIG. 2 is a partial perspective view of the filter mat with connecting clip as shown in FIG. 1, not welded.

As is to be seen in FIGS. 1 and 2 in particular, the plastic or connecting clip 18 is placed in position with its two free enclosing limbs 24 on the free limbs or free ends 14 of the filter mat 10. As a result of its inherent elasticity, the clip 18 holds or clamps these ends 14 together. The two enclosing limbs 24 of the clip 18 are connected by a bow-shaped connecting piece 26. The connecting piece 26 forms a clearly defined contact area for the free ends 14 of the filter mat 10 because of the opposite enclosing limbs in this area. This structure makes certain that the two ends 14 end at more or less the same level and assume a clearly defined position relative to each other for the subsequently provided welding process still to be described. Because of the inherent elasticity of the clip 18, this possibility of clearly defined positioning is already provided in the area of the enclosing limbs 24 and not just in the bow-shaped contact base of the connecting piece 26. The plastic clip 18 is optimized in that the clear opening for insertion of the filter mat ends 14 is kept somewhat smaller than the width of the two stacked filter mats 14. Because of the elasticity behavior of the plastic of the clip 18, such clip is pressed into contact with the free filter mat ends 14. Production of the clip 18 may be made especially cost effective in that the clip, analogous to the filter mat 10, is composed of stacked or pleated bows which are separated from each other and then form a longitudinal clip 18. In order not to impair the possibility of insertion of the filter mat ends 14, in the area of the clear ends of the two enclosing limbs 24, the clip 18 is provided with a bow-shaped insertion accessory extending outward.

In the welding process for production of the connection interface, with the filter mat ends 14 in the connected position illustrated, these ends are joined together by application of a flat weld seam. This flat weld seam, designated as a whole as 28, is provided in the area of the filter mat ends 14 with an embossed path and accordingly with an embossed weld seam or an embossed weld seam portion 30. There is also provided in contrast, between this embossed weld seam 30 and the beginning of the area of transition of the tubular filter mat 10 from which ends 14 extend, an area with a smooth weld seam or smooth weld seam portion 32, free of embossing, in a flat path along the filter mat ends 14. Consequently, the plastic clip 18 is thermally shaped by the welding process and then provided with embossing 34 (cf. FIG. 6) which corresponds more or less to the screenlike basic structure of the metal wire fabric 22. The thermally shaped plastic material of the clip 18 enters the clear spaces inside the lattice structure of the plastic or metal wire fabric 22, so that an especially strong bonding is achieved. This bonding is additionally supported in that the laminate unit 20, which to some extent at least also contains plastic materials, is welded at the same time. Introduction of the embossing 34 is also accompanied by production of the smooth weld seam 32, which ensures, among other things, that the embossed weld seam 30, which is weakened at least to some extent in cross-section by the embossing 34, is kept free of harmful stresses resulting from changes in pressure and peak stresses. In the opposite direction, the embossing 34 permits precise adjustment of the filter mat ends 14 during the welding process, so that the smooth paths come to lie cleanly one on the other in the area of the smooth weld seam and so a high-strength welded connection is achieved without the possibility of formation of a potential leakage point by any warping of the material of the path.

An ultrasonic welding process is used for welding the filter mat ends 14 to the connecting device. However, other thermal welding processes may also be applied.

As is shown by FIG. 3 in particular, the linear relationships selected, in any event in the area of the connecting seam, are such that the connecting device, as viewed in the radial direction, ends along the outer radial circumference of the filter mat 10. Consequently, the filter mat ends 14 are embedded in the clip 18 when the latter is in the molten state, so that non-detachable, permanent bonding with the filter mat 10 or the filter element for later filtration is obtained. The embossing 34 may be made along one enclosing limb 24 or along both enclosing limbs 24. In addition, the respective connection interface may be produced by way of an embossed weld seam 30 and a smooth weld seam 32 with the connecting device or without the connecting strip 16. The connection is to be preferred especially if the filter mats 10, and accordingly the ends 14 as well, have a highly weldable plastic component so that the welding process may be conducted without problems. In such case, it must be ensured for the equipment that the filter mat ends 14 will not be unintentionally displaced relative to each other during the welding process.

Figure 4:
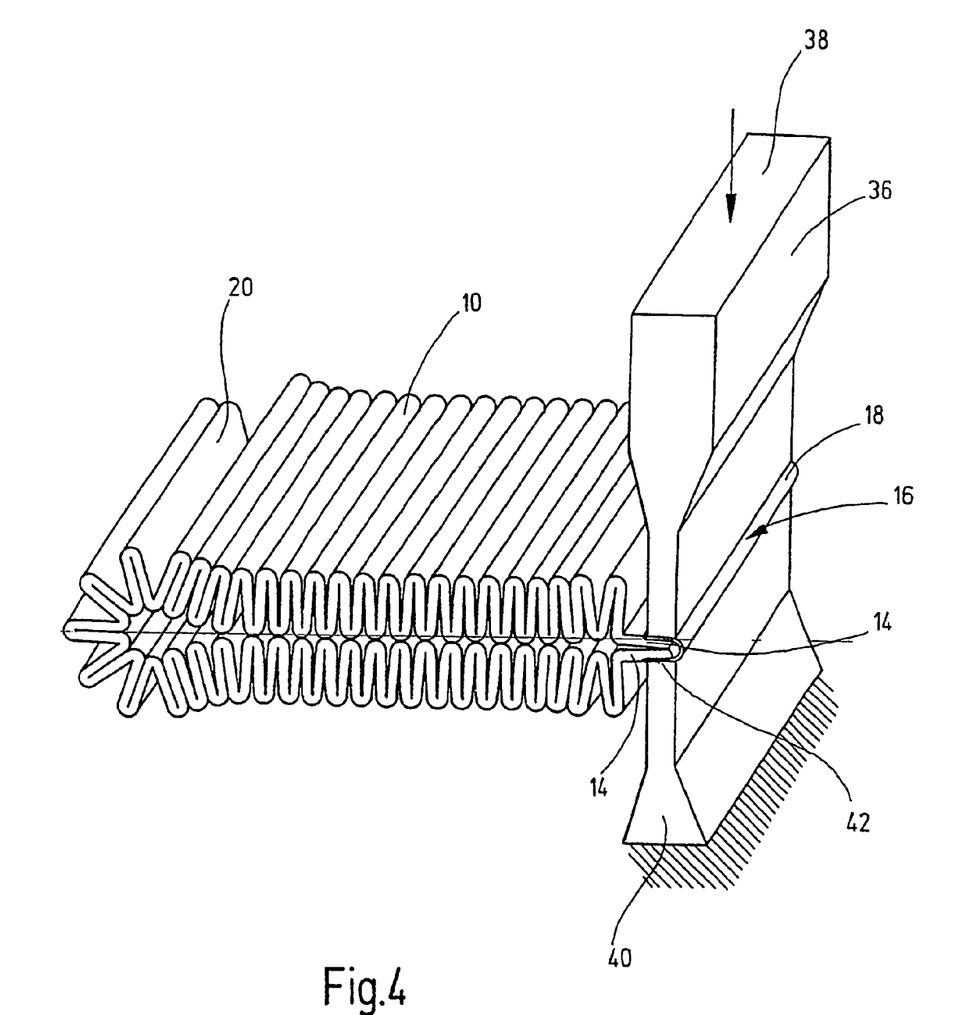
FIG. 4 is a perspective view of the essential components of the device for production of the welded connection according to an embodiment of the present invention.

FIG. 4 illustrates the ultrasonic welding device 36 with which the thermal welding process may be carried out. The ultrasonic welding device has a sonotrode 38 in the form of a strip, and an anvil 40 in the form of a strip. The anvil 40 of the ultrasonic welding device 36 is mounted to be more or less stationary. The sonotrode 38 is movable for a welding process in the direction indicated by the arrow in FIG. 4 from an initial position toward the welding deposit in the form of the straight bead clip 18 for a welding process. For the purpose of the welding process, the filter mat 10 with its filter folds are placed together as indicated in FIG. 4. After the clip 18 has been placed in position, the filter mat ends 14 are welded to this clip. The welding process may be further facilitated by auxiliary handling measures. It is also possible, however, to introduce the filter mat 10 into the welding device 36 by hand.

Figure 6:
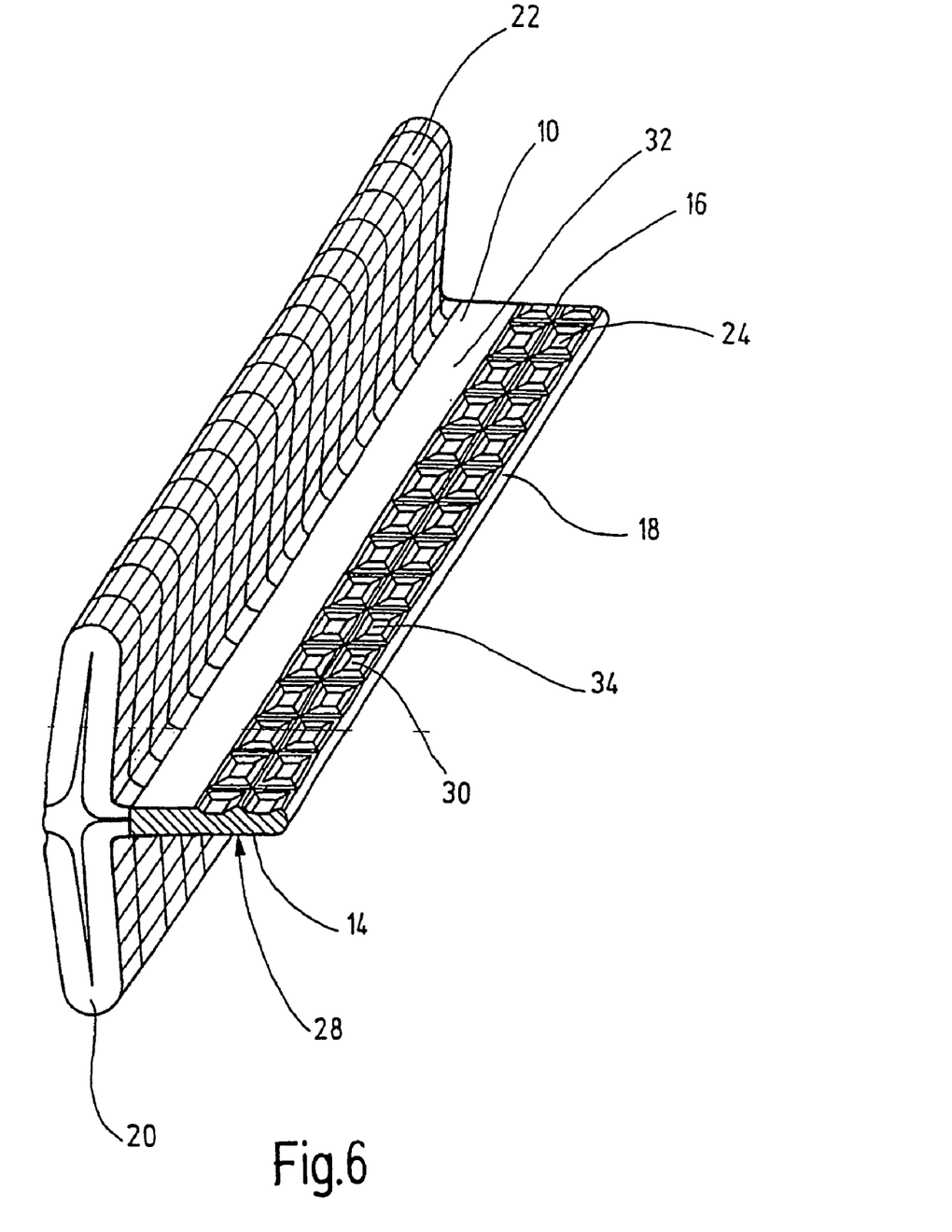
FIG. 6 is a partial perspective view of a weld seam produced with the device shown in FIG. 4 with a smooth weld seam and an embossed weld seam in which the connecting clip is used, according to an embodiment of the present invention.

After the welding process has been completed, the sonotrode 34 is removed and the weld seam is formed as shown in FIG. 6. The filter mat 10 may be converted to a tubular configuration and assembled on the support tube 12 as a further addition to the complete filter element.

The welding process effects sealing of the bevel edges to prevent fiber migration, so that, for example, glass fibers of the filter medium are effectively retained in the filter mat 10. The clip 18 is dimensioned with respect to the amount of plastic required so that the connecting seam may be produced in any event without welding filler. The filter mat 10 of this invention and the device 36 for producing this filter mat make possible an efficient production process without use of a connecting adhesive, such as an epoxy resin adhesive, so that there is no period of waiting for the adhesive to set. The filter mat 10 or the filter element may immediately be put to further use. Dispensing with the adhesives regularly containing solvents also has a favorable effect on the environment.

Figure 5A:
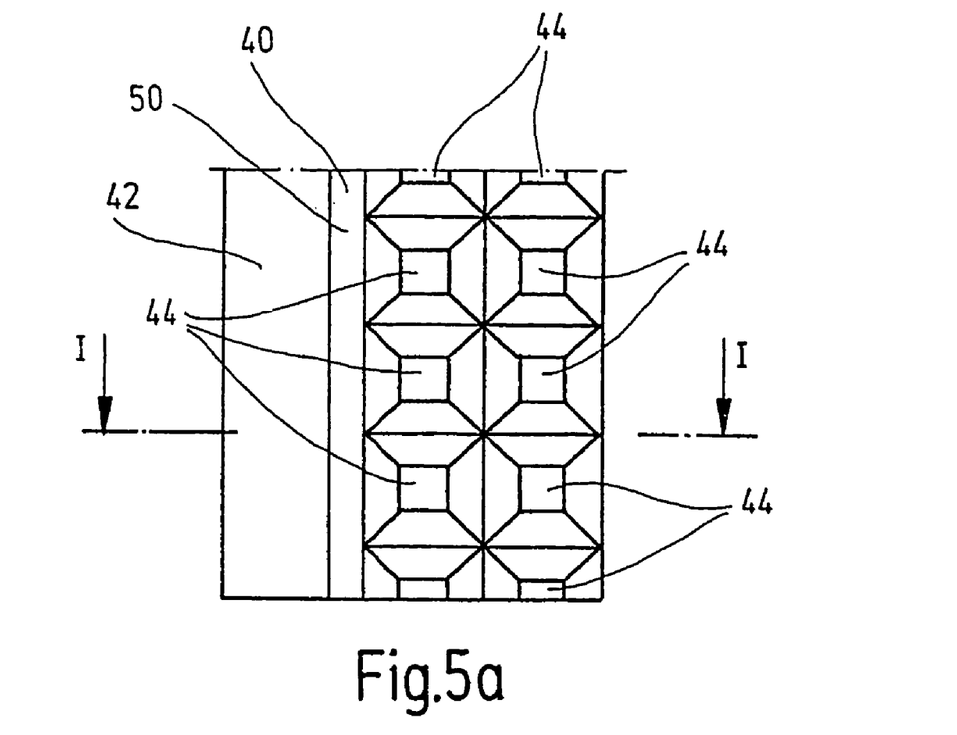
FIG. 5*a* is a top plan view of a part of the anvil shown in FIG. 4.
Figure 5B:
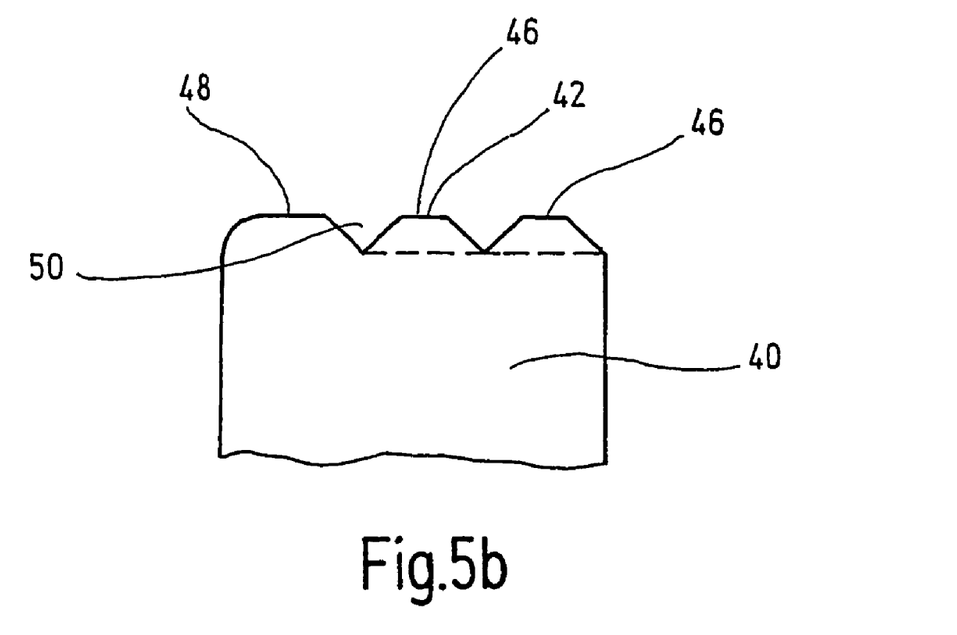
FIG. 5*b* is a side elevational view of a part of the anvil shown in FIG. 4.

FIGS. 5a and 5b present a top view and a side view of a section along the top of the anvil 40. As seen in FIGS. 5a and 5b, the embossing 34 is obtained with individual elements 44 that are square in cross-section. FIG. 5b, which represents a cross-section along line I—I in FIG. 5a, makes it clear that the respective individual elements 44 are roof-shaped in cross-section in their areas of transition. The flat roof elements 46 are positioned in a plane with the top of the fusion welding sheeting 48 producing the top of the smooth weld seam 32. The fusion weld sheating 48 has approximately the same width as the total width of the individual roof elements 46 of the individual elements 44, which are integrated into the top 42 of the anvil 40 in two parallel rows. The individual elements 44 are provided with corresponding drafts relative to their roof elements 46 in order to be able to ensure a good ejection process. A mold release bevel 50 is also provided in the area of transition between the individual elements 44 and the fusion welding sheeting 48.

The embossed weld seam 30 which may be produced in this way by means of the anvil 40 and the smooth weld seam 32 complement each other very logically and permit production of reliable high-strength connection in the area of the filter mat ends of filter elements.

While various embodiments have been chosen to illustrate the invention, it will be understood by those skilled in the art that various changes and modifications can be made therein without departing from the scope of the invention as defined in the appended claims.

What is claimed is:

1. A method for producing a connection interface in a tubular filter element for filtration of fluids, comprising the steps of:
    arranging a filter mat to locate first and second free ends thereof adjacent to and overlapping one another at a connection point; and
    interconnecting the free ends at the connection point by forming a flat weld seam extending along the free ends with an embossed weld seam portion and with a smooth weld seam portion free of embossing between the embossed weld seam portion and a transition area of the filter mat from which the free ends extend.

2. A method according to claim 1 wherein
    the embossed weld seam portion and the smooth weld seam portion are formed simultaneously.

3. A method according to claim 1 wherein
    a connecting strip, configured as a clip and formed of theremoplastic material, is placed about the free ends of the filter mat prior to forming of the flat weld seam to hold the free ends together during welding.

4. A method according to claim 1 wherein
    the filter mat has a plastic fabric on an outer surface thereof.

5. A method according to claim 1 wherein
    the filter mat comprises, at least in part, thermoplastic materials.

6. A method according to claim 1 wherein
    the embossed weld seam portion is formed with rectangular embossing elements.

7. A method according to claim 1 wherein
    the embossed weld seam portion is formed with square embossing elements.

8. A method according to claim 1 wherein
    the filter mat has a screen fabric with openings on an outer surface thereof; and
    the embossed weld seam portion is formed with embossments corresponding and extending into the openings.

9. A method according to claim 1 wherein
    the filter mat is tubular and pleated and has a multiple layers, said layers comprising at least one of a polyester fabric layer, a glass fiber layer, a meltblown fabric layer, a composite special steel and polyester fabric layer, a plastic fabric layer and a metal wire fabric layer.

10. A method according to claim 3 wherein
    the connecting strip is formed of a polyamide or polyester material.

11. A method according to claim 1 wherein
    the flat weld seam is formed by ultrasonic welding without welding filler and without a connecting strip.

12. A method according to claim 3 wherein
    the connecting strip is applied in a radial direction of the filter mat and along an outer circumference of the filter mat.

13. A tubular filter element for filtering fluids, comprising
    a filter mat having first and second free ends adjacent to and overlapping one another, and a transition area from which said free ends extend; and
    a flat weld seam at a connection point joining said free ends, said flat weld seam having an embossed weld seam portion and a smooth weld seam portion free of embossing between said embossed seam portion and said transition area.

14. A tubular filter element according to claim 13 wherein
    said filter mat comprises an outer layer of a screen with openings therein; and
    said embossed seam portion comprises embossments corresponding to and extending into said openings.

15. A tubular filter mat element according to claim 13 wherein
    said free ends extend radially outwardly from said transition area.

* * * * *